(12) United States Patent
Annavajjala et al.

(10) Patent No.: US 8,811,545 B2
(45) Date of Patent: Aug. 19, 2014

(54) METHOD FOR REDUCING INTERFERENCE IN OFDM WIRELESS NETWORKS

(75) Inventors: Ramesh Annavajjala, Natick, MA (US); Liangbin Li, Irvine, CA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 247 days.

(21) Appl. No.: 13/291,546

(22) Filed: Nov. 8, 2011

(65) Prior Publication Data
US 2013/0114765 A1    May 9, 2013

(51) Int. Cl.
*H04L 27/06* (2006.01)
*H04L 23/02* (2006.01)

(52) U.S. Cl.
USPC ............ 375/341; 375/262; 375/265; 375/340

(58) Field of Classification Search
USPC ......... 375/219, 220, 222, 261, 260, 259, 262, 375/263, 264, 265, 267, 268, 271, 272, 274, 375/278, 279, 280, 283, 284, 285, 295, 296, 375/300, 302, 305, 309, 316, 320, 322, 324, 375/325, 329, 334, 348, 147, 148, 150, 375/240.26–240.29, 286, 340, 339, 341, 375/344, 345, 346, 347; 714/1, 2, 752, 786, 714/791, 792, 793, 794, 795, 799, 800
See application file for complete search history.

(56) References Cited

U.S. PATENT DOCUMENTS

| | | | |
|---|---|---|---|
| 2011/0239089 A1* | 9/2011 | Haratsch et al. | 714/763 |
| 2011/0305082 A1* | 12/2011 | Haratsch et al. | 365/185.03 |
| 2013/0089164 A1* | 4/2013 | Murakami et al. | 375/295 |
| 2013/0121441 A1* | 5/2013 | Murakami et al. | 375/296 |

* cited by examiner

*Primary Examiner* — Sam K Ahn
*Assistant Examiner* — Linda Wong
(74) *Attorney, Agent, or Firm* — Dirk Brinkman; Gene Vinokur

(57) ABSTRACT

Interference in a received orthogonal frequency division multiplexing (OFDM) symbol, modulated according to selected constellation points $s_k$, is reduced. The symbol includes a set of pilot signals and a set of data signals $y_k$, where k is a number of consecutive subcarriers used for the pilot and the data signals. The pilot signals are thresholded to detect interfering pilot signals, which are then erased. Channels $\hat{H}_k$ are estimated using remaining pilot signals. The set of data signals are decoded based on the estimated channels $\hat{H}_k$, and, for each bit $b_i$ in the set of data signals, a logarithmic likely ratio (LLR)

$$\log \frac{\sum_{s_k : b_i = 0} \frac{1}{|y_k - \hat{H}_k s_k|^2}}{\sum_{s_k : b_i = 1} \frac{1}{|y_k - \hat{H}_k s_k|^2}}$$

is determined. The LLR is an indicator of the likely interference.

6 Claims, 10 Drawing Sheets

METHOD FOR REDUCING INTERFERENCE IN OFDM WIRELESS NETWORKS

FIELD OF THE INVENTION

This invention relates generally to wireless communications, and more particularly to encoding and decoding orthogonal frequency division multiplexing (OFDM) signals subject to partial-band and partial-time interference.

BACKGROUND OF THE INVENTION

The number of wireless communication modalities sharing the same frequency band continues to increase. This means that simultaneous transmissions are more likely to interfere with each other, particularly if an interfering transmitter is close to an intended receiver. This decreases the reliability of the wireless communications.

Interference rejection has been used to protect against partial-band and partial-time interference. Two known methods can reject interference: erasure and clipping. For the erasure, the receiver detects whether a signal sample is corrupted by interference, and erases the sample with a zero. For the clipping, the sample is replaced with a neighboring uncorrupted sample.

Another approach uses message passing and models interference as equivalent Gaussian noise. The existence of interference is detected, and its variance is estimated. Then, the log-likelihood ratio (LLR) of received symbols can be determined based on the estimated interference variance. Soft-iterative decoding is conducted using the LLRs as input to channel decoder to resolve the interference.

OFDM networks are used for high data-rate transmission in multipath channels, e.g., networks according to the IEEE 802.11a and 802.11g (WiFi) standards. Those networks use a fast-Fourier transform (FFT) to convert inter-symbol-interference (ISI) time-domain channels into parallel frequency-domain channels. Thus, symbols are transmitted without ISI in the frequency domain. An OFDM symbol includes a set of data signals and a set of pilot signals, each on a different subcarrier. Known symbols are transmitted using the set of pilot signals to estimate the channels for the set of data signals.

Partial-band and partial-time interference (PBPTI) can corrupt the transmission of wideband OFDM signals. On the unlicensed radio spectrum, Bluetooth networks can coexist with OFDM networks. The frequency-hopping Bluetooth signals block the transmission of some subcarriers of wideband OFDM signals, thereby generating PBPTI for OFDM networks. The interference corrupts consecutive subcarriers and hops to different subcarriers over the transmission.

Most known methods require statistics of the channel and interference before any processing can be done on any portion of the received signal. For example, a hypothesis test can be used for interference detection. Also, when the channel statistics, e.g., the power-delay profile, are known, time-domain channel estimation method can be used. Compared to the frequency-domain channel estimation approaches, the time-domain method estimates a smaller number of unknown channel coefficients. Thus, it is more resilient to interference than the frequency-domain method. When the interference statistics are known, interference can be treated as noise with a known variance. Its log-likelihood ratio (LLR) can be determined, and soft iterative decoding can be used to recover the data.

When the channel and interference statistics are not known at the receiver, estimating all required parameters using prior art methods can be prohibitively complex. The invention solves this problem.

In addition to PBPTI, OFDM networks are vulnerable to fast-varying channel conditions. It is desired to provide OFDM networks and methods for joint wireless channel estimation and PBPTI detection with reduced interference.

SUMMARY OF THE INVENTION

Embodiments of the invention provide a method for reducing PBPTI in an OFDM network. A transmitter uses low-density parity check (LDPC) codes and random pilot allocation to reduce interference.

A receiver performs threshold detection on a set of pilot signals to dynamically estimate the channel and detect interference, and channel estimation with pilot rejection, and soft iterative decoding without estimating interference spectrum. The receiver in our invention does not require the statistics of the channels and the interference before processing the received signal.

DETAILED DESCRIPTION OF THE PREFERRED EMBODIMENTS

Embodiments of the invention describe a method for reducing PBPTI in an OFDM network.

Figure 1:
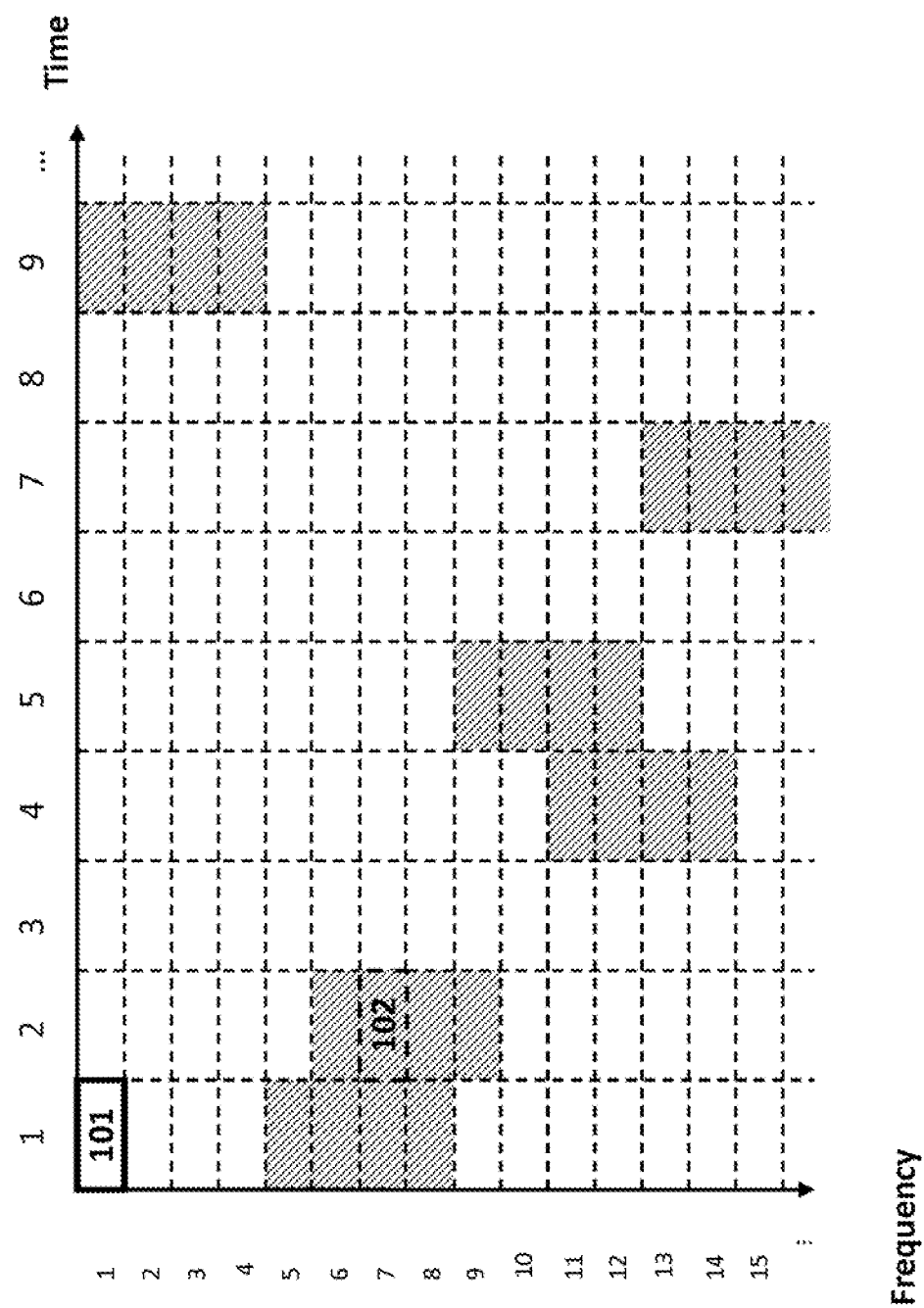
FIG. 1 shows an example of PBPTI in an OFDM network according to embodiments of the invention.

FIG. 1 shows example OFDM signal blocks 101. In this example, partial-band and partial-time interference (PBPTI) interference 102 corrupts four consecutive subcarriers k. The interference appears in OFDM symbol time instances 1, 2, 4, 5, 7. The existence of this interference is unknown at a transmitter and a receiver. Also, the PBPTI corrupts different subcarriers at different time instances.

Because the parameters of the interference, e.g., existence, location, power, coherent bandwidth, and spectrum of the interference, are unknown, the interference can corrupt signals on both the pilot and the data subcarriers.

Interference detection, channel estimation and data detection are needed to improve the performance of networks affected by PBPTI. The invention reduces this type of interference, without have knowledge of the channel and interfere prior to processing the signal.

Figure 2:
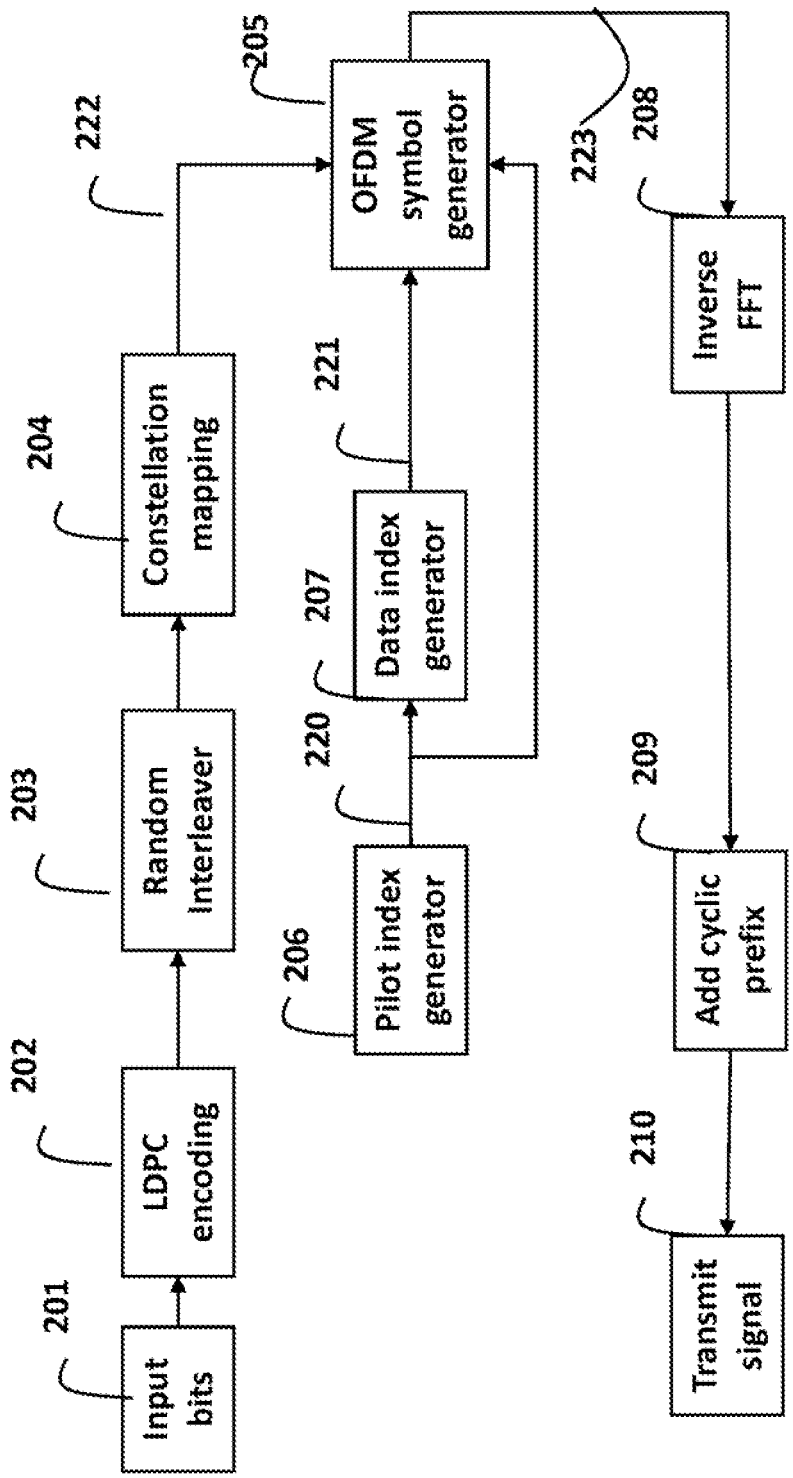
FIG. 2 is a block diagram of a transmitter for LDPC encoding, random pilot signals assignment according to embodiments of the invention.

FIG. 2 shows a portion of a transmitter for baseband signal processing. Input binary information bits 201 are encoded by a LDPC block code 202. A random interleaver 203 is used to reduce PBPT interference. The output binary bits are modulated using conventional mapping 204 to constellation points ($s_k$), e.g., BPSK, QPSK, 16-QAM and 64-QAM.

Modulated symbols 222 are embedded to data subcarriers of OFDM symbols given the data subcarrier indexes 221. Pilot signals are also inserted to pilot subcarriers of OFDM symbol using the pilot subcarrier indexes 220. The generated OFDM symbols 223 are converted to time-domain through inverse fast-Fourier transform (IFFT) 208, followed by adding cyclic prefix (CP) 209 to the beginning of OFDM symbols. The resulting signals 210 are transmitted on subcarriers of radio wireless channels, subject to the PBPTI.

The pilot indexes 220 are generated in the pilot index generator 206. The data index generator 207 selects the subcarrier indexes that are not in the pilot indexes 220 to generate the data indexes 221.

Figure 3:
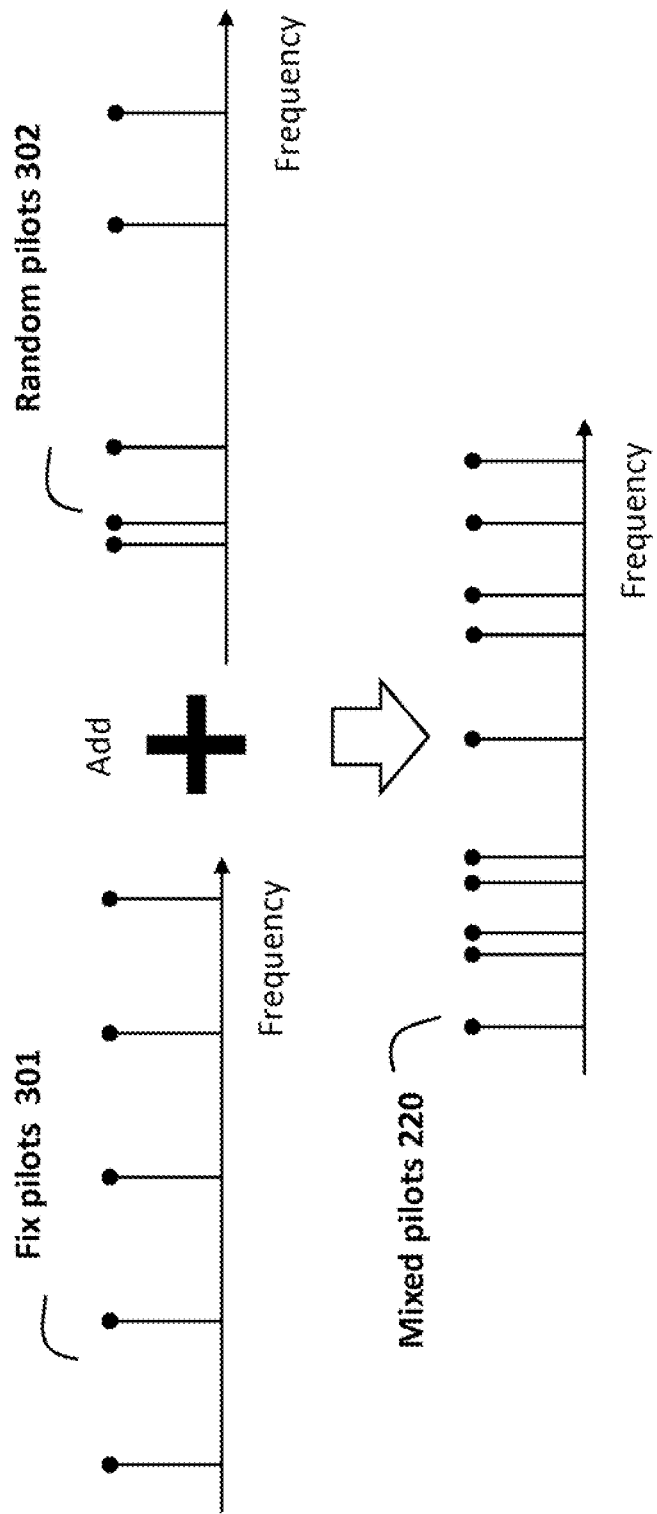
FIG. 3 is a schematic of constructing random pilot allocation according to embodiments of the invention.

FIG. 3 shows a dynamic process to generate the pilot indexes 220. First, $N_F$ indexes with equal spacing 301 are generated. These fixed pilot signals are unchanged for different OFDM symbols and provide a minimum spacing between any two pilot subcarriers. Then, $N_R$ indexes with random spacing 302 are generated. The random pilot signals reduce interference that corrupts the same subcarriers during the transmission of different OFDM symbols. The fixed indexes 301 and random indexes 302 are added to generate the set of pilot signals 220 to be transmitted.

The ratio between the number of random pilot signals and that of fixed pilot signals, i.e., $N_R/N_F$, describes the randomness of the pilot indexes. When the ratio is zero, only fixed pilot signals are used. When the ratio is equal to infinity, only random pilot signals are used. The invention considers random pilot signals, fixed pilot signals, and combinations thereof.

Figure 4:
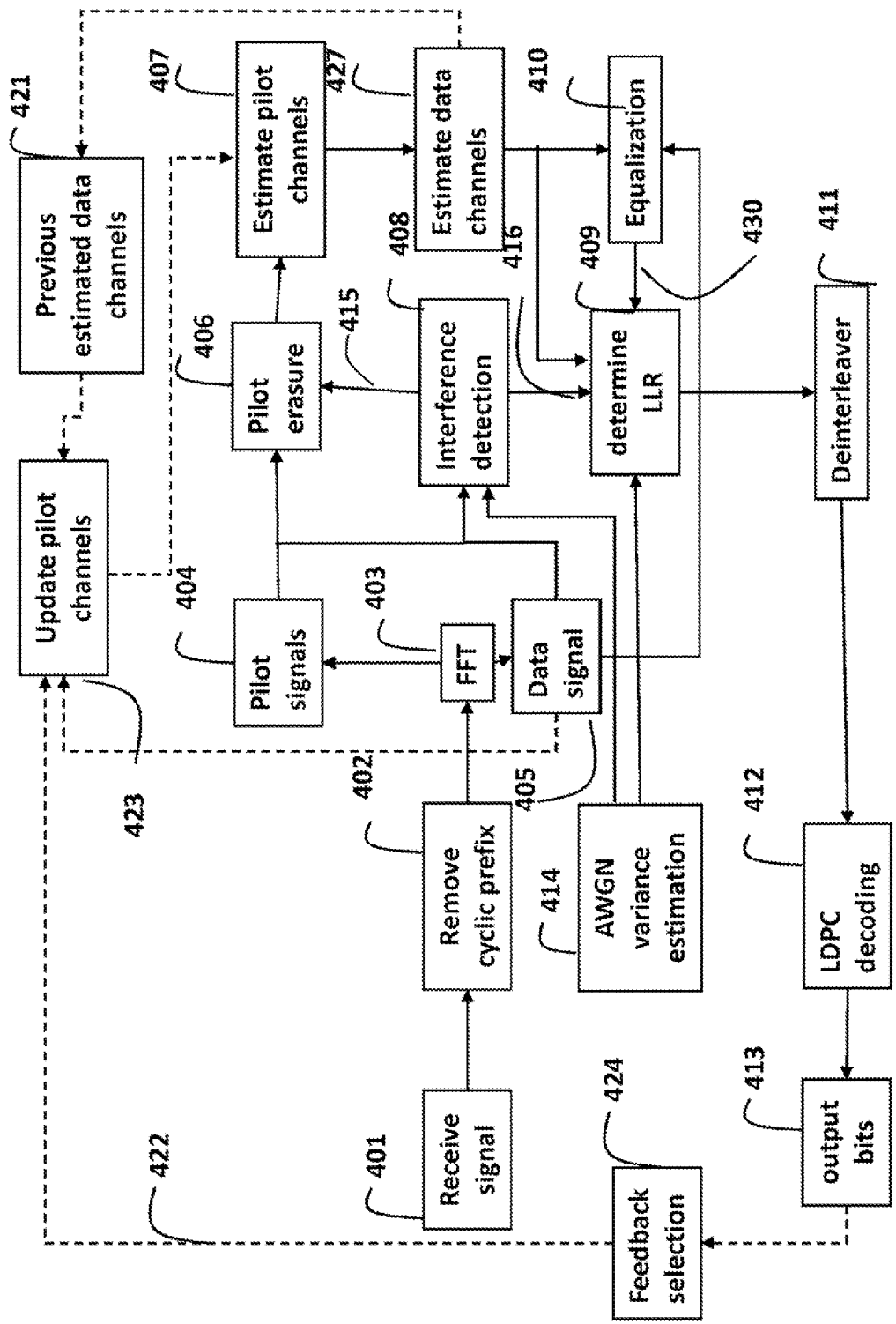
FIG. 4 is a block diagram of a receiver performing interference detection, wireless channel estimation, soft iterative decoding, and decision feedback according to embodiments of the invention.

FIG. 4 shows baseband signal processing at a receiver. The cyclic prefix is removed 402 from the received signals 401. The output signals are transformed to frequency domain using FFT 403. The frequency signals include of two parts: the set of pilot signals 404 and the set of data signals 405.

Interference can be detected by comparing the relative power of each received pilot signal on a subcarrier to the estimated AWGN variance 414. The output from interference detection 408 is composed of two parts: estimated corrupted pilot indexes 415 and estimated corrupted data indexes 416. The corrupted pilot signals are erased 406. The remained pilot signals in the set are used to estimate 407 the channels on pilot subcarriers, which are used in turn to estimate channels 427 on data subcarriers.

The set of received data signals 405 are equalized 410 using the estimated data channels. The log-likelihood ratio (LLR) of data subcarriers is determined 409 using estimated channels, equalized data, estimated AWGN variance, and estimated corrupted data indexes.

The LLRs of bits received in different OFDM symbols are concatenated and deinterleaved 411. Soft iterative decoding using a message passing procedure to decode the LDPC encoded OFDM waveforms.

The decoded bits can be feedback to improve channel estimation. The posterior LLR of each decoded bit can be obtained from the output of the LDPC decoder 413. Part of the bits with high posterior LLR can be selected 424 to be added to pilot signals. The channels of newly added pilot signals, previously on data subcarriers, can be updated 423 to combine with the previously interpolated data channels 421. Then, more pilot channels can be used to estimate data channels. The quality of channel estimation is thus improved to correctly decode more data.

The embodiments of the invention provide the following features and advantages. Interference detection uses all pilot and data signals in the respective sets on the various subcarriers. Pilot erasure is used for channel estimation. LLR determination is used to resolve unknown interference spectrum, and decision feedback of the LLR improves channel estimation.

Interference Detection

The set of pilot signals 404 and the set of data signals 405, in the frequency domain, can be expressed as $$Y_k = H_k + n_k + I_k, k \in N_P,$$

$$Y_k = H_k s_k + n_k + I_k, k \in N_D,$$

where $Y_k$, $H_k$, $s_k$, $I_k$ denotes the received signal, the channel, data symbol constellation, the AWGN, and the interference on subcarrier k, respectively. The subcarrier indices for pilot signals are denoted $N_P$, and $N_D$ denotes the set of the subcarrier indices for data.

Figure 5:
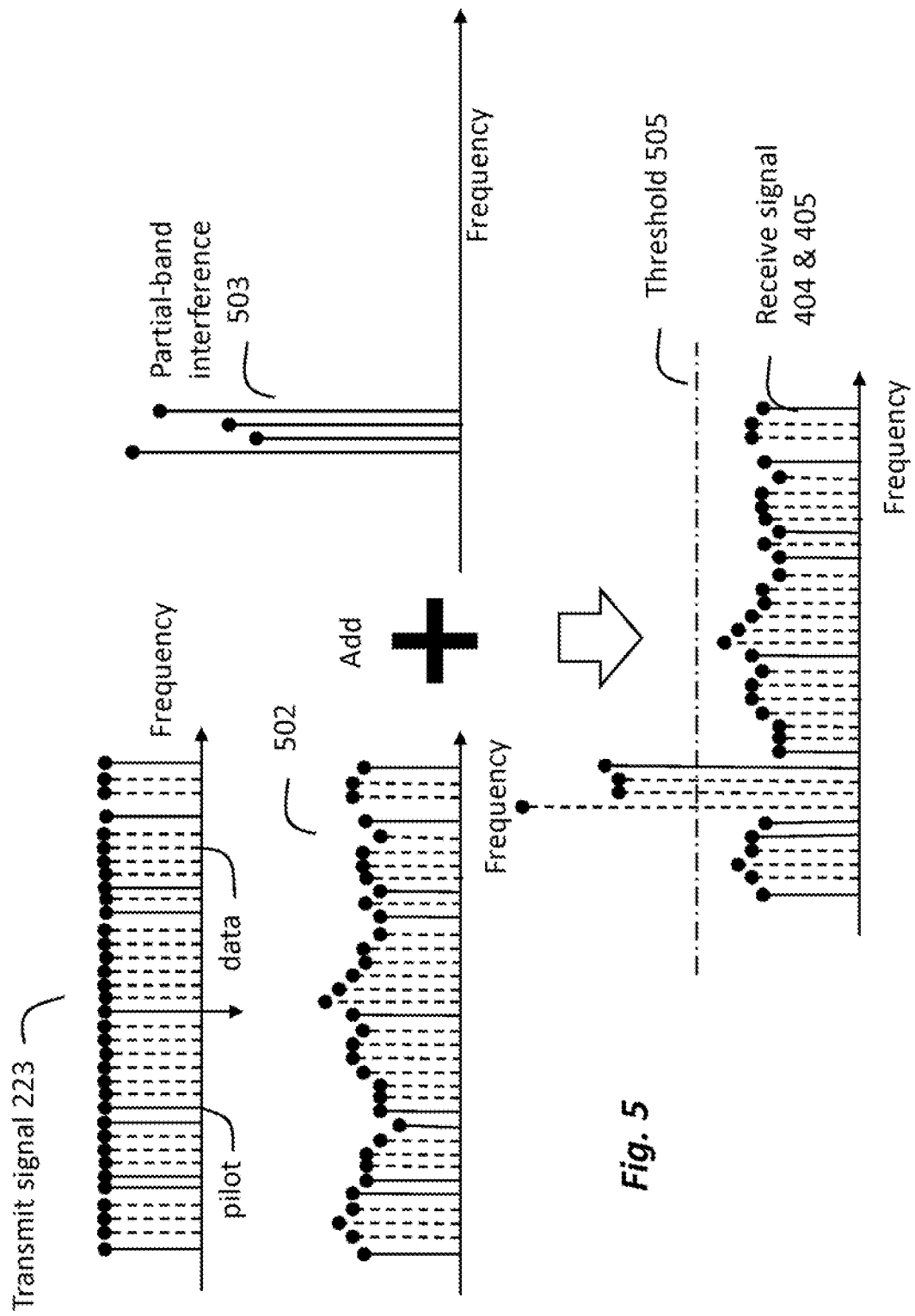
FIG. 5 is a schematic of interference detection using both pilot signals and data signals according to embodiments of the invention.

FIG. 5 shows the idea of our interference detection and reduction. When the transmitter uses equal-energy constellations, e.g., BPSK and QPSK, the spectrum of transmit signal 223 is flat. The channel $H_K$ changes very slowly because the number of multipath channels is smaller than the number of frequency-domain subcarriers.

The norm of the additive noise term $n_k$ is comparatively smaller than that of the interference $I_k$. Then, the norm of signal plus noise in the receive signals 502 does not change quickly over the frequency.

Because the receiver does not know the channel $H_k$, $H_k$ is assumed to be Gaussian distributed with a normalized variance of unity. For the subcarrier not corrupted by interference, i.e., $I_k=0$, $Y_k$ is Gaussian distributed with variance $1+\sigma^2$, where $\sigma^2$ denotes the variance of $n_k$. For the subcarrier corrupted by interference, $Y_k$ is Gaussian distributed with variance $1+\sigma^2+\omega_k^2$, where $\omega_k^2$ denotes the variance of $I_k$.

Because the PBPTI 503 has a higher power than the additive noise 503, it can be detected by comparing the norm of $Y_k$ to a predetermined threshold 505. The pilot signals on subcarriers with magnitude higher than the threshold are detected as corrupted by interference. The pilot signals with magnitude lower than the threshold are detected as uncorrupted.

Pilot Erasure and Channel Estimation

Figure 6:
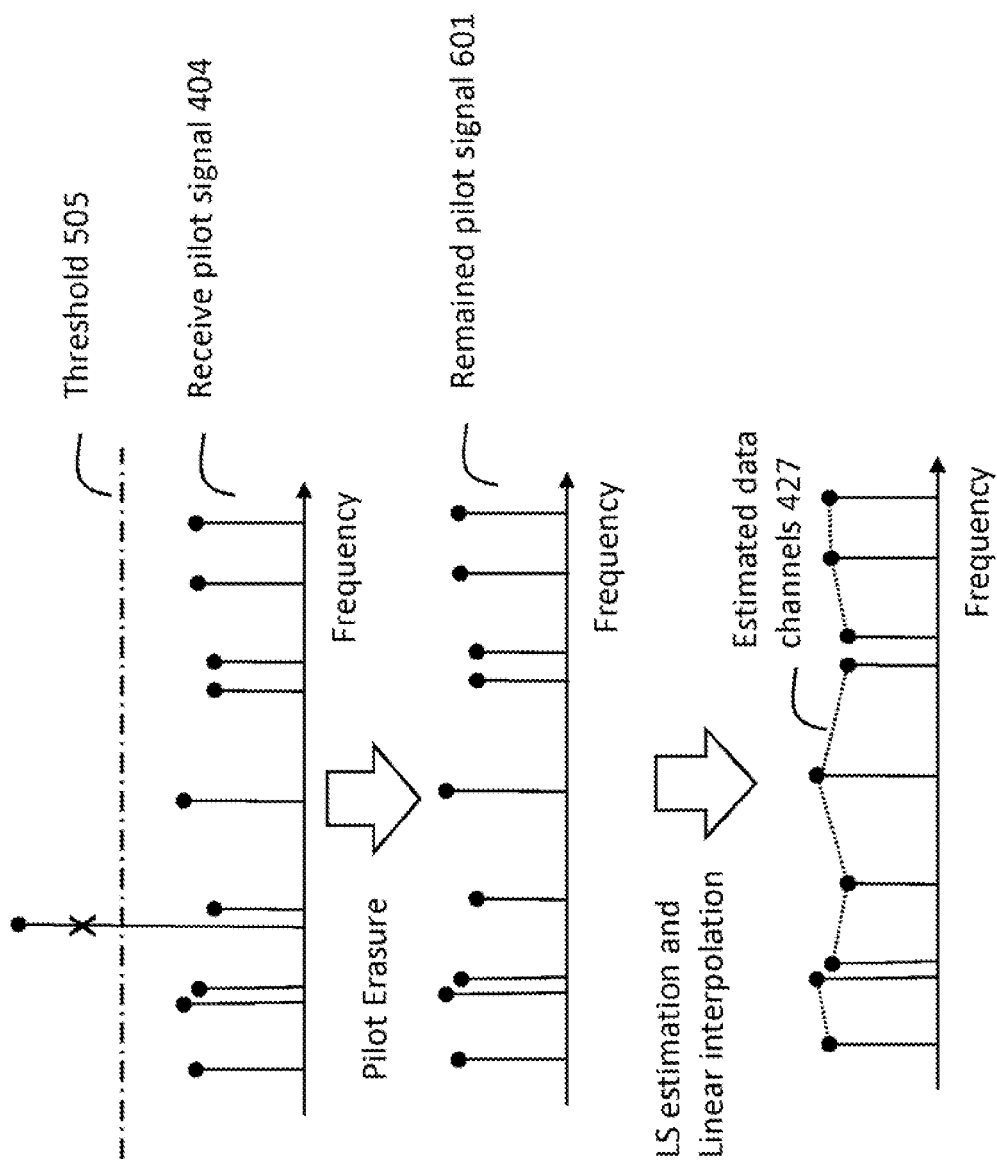
FIG. 6 is a schematic of pilot erasure combined with linear interpolation of least-square (LS) frequency-domain channel estimation according to embodiments of the invention.

As shown in FIG. 6, after erasing pilot signals 404 higher than the threshold 505, the remained uncorrupted pilot signals 601 can be used to estimate channels. Prior channel estimation procedures can be used here. For example, when the receiver has no statistical information of the channels, least-square (LS) estimation of pilot channels can be performed. The channels on the data subcarriers 427 can be estimated by linear interpolation or triangular interpolation or since interpolation, to name a few.

Equalization and LLR Determination

The estimated data channels can be used to equalize the receive signal $Y_k$ 410 as 430

$$\tilde{Y}_k = \frac{Y_k \hat{H}_k^*}{|\hat{H}_k|^2},$$

$k \in N_D.$

The equalized signal 430 is used to calculate LLR for each bit.

For the LLR determination, we provide two novel determinations that do not need the variance of interference $\omega_k^2$.

Figure 7A:
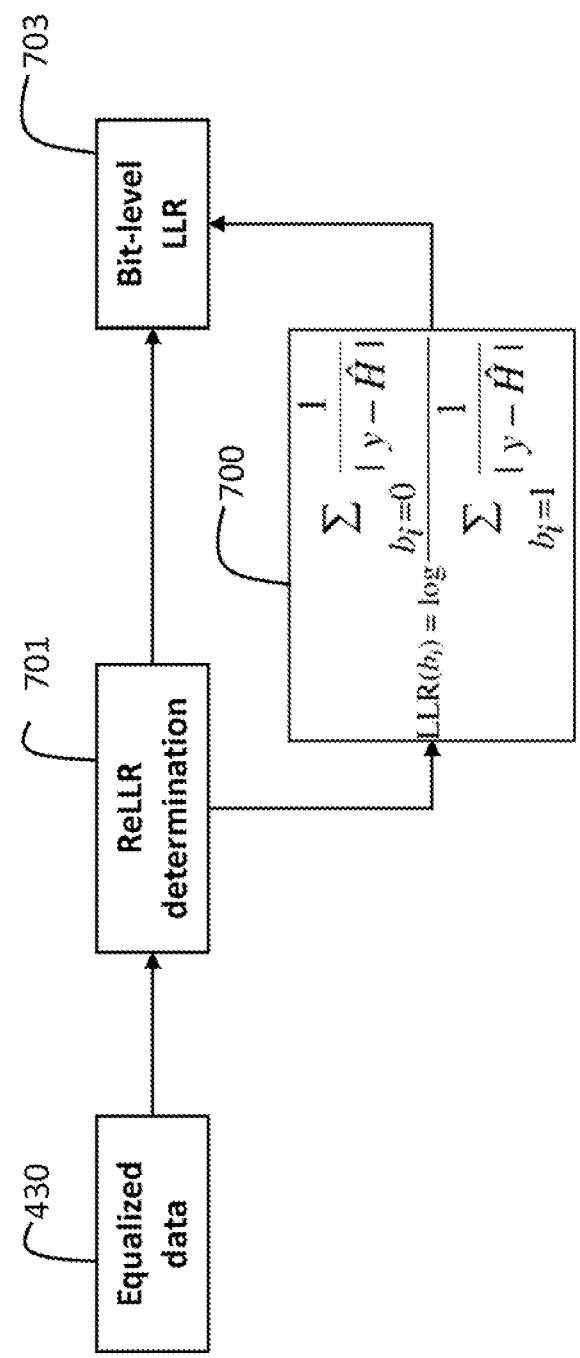
FIG. 7A is a block diagram of determining resilient LLRs according to embodiments of the invention.
Figure 7B:
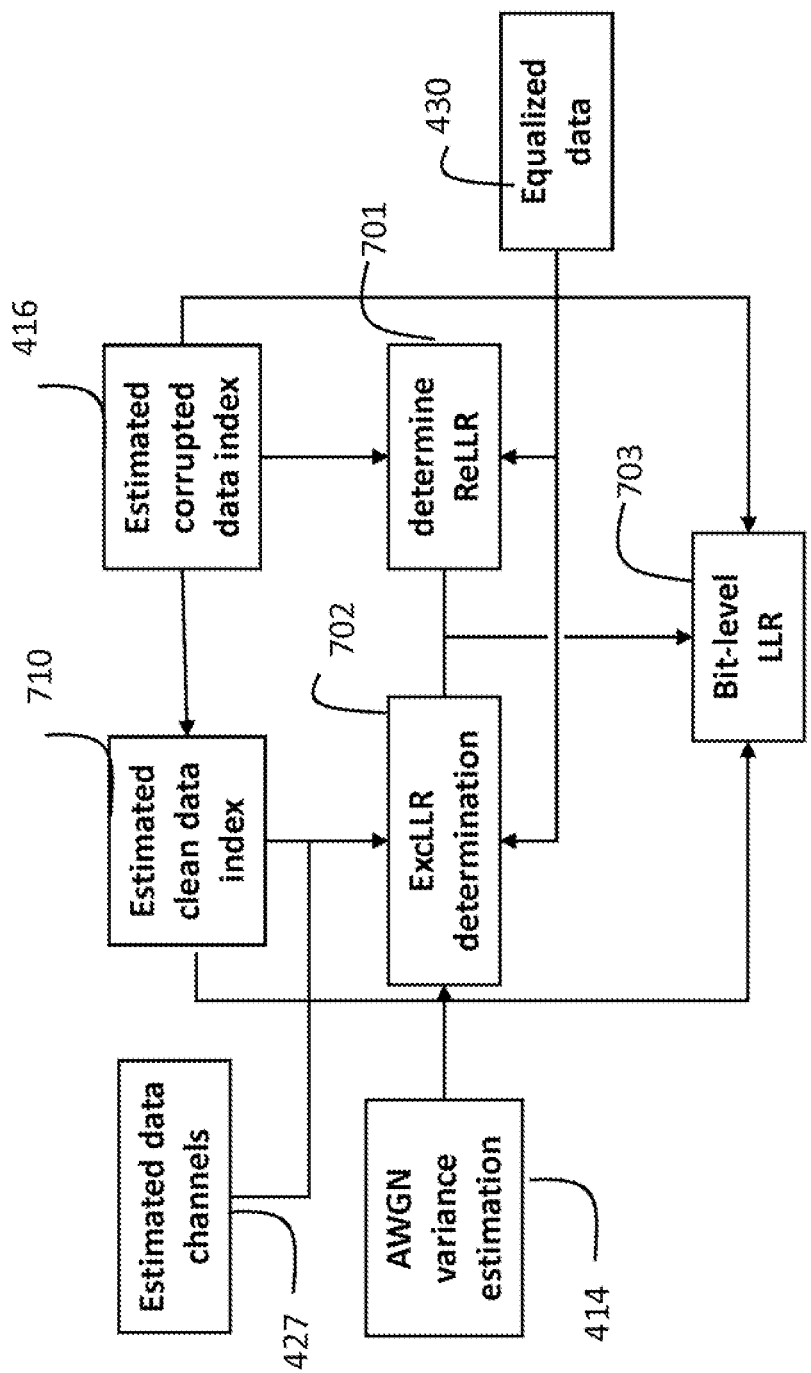
FIG. 7B is a block diagram of determining dynamic LLRs according to embodiments of the invention.

FIG. 7A shows an interference resilient LLR (ReLLR) method. FIG. 7B shows a dynamic LLR (DynLLR) method.

The ReLLR method only needs the equalized data signals 430. To obtain the ReLLR 700 for bit $b_i$, the receiver determines 701

$$LLR(b_i) = \log \frac{\sum\limits_{s_k:b_i=0} \frac{1}{|y_k - \hat{H}_k s_k|^2}}{\sum\limits_{s_k:b_i=1} \frac{1}{|y_k - \hat{H}_k s_k|^2}}.$$

The above summation is over the constellation points $s_k$ with constraint on bit $b_i$ to be either 0 or 1, and where k is a number of subcarriers.

In other words, for a given constellation, the ReLLR for bit $b_i$ can be determined using the following steps:
1) partition the signal constellation into two sets, one set containing all the constellation symbols with bit $b_i=0$, and the other set containing all the constellation symbols with bit $b_i=1$; and
2) For each of the above two sets, form a metric that is equal to the sum of the inverse squared distances of the received signal $y_k$ and the product of the estimated channel $\hat{H}_k$ and the constellation symbol in the set;
3) Take the logarithm of the ratio of the two metrics as computed in the above step. This quantity represents the ReLLR for the bit $b_i$.

The DynLLR method uses both the LLR determination as known in the prior art, and the ReLLR determination according to embodiments of the invention. The DynLLR method estimates data channels 427, corrupted data indexes 416, AWGN variance 414, and equalized data 430.

This method also does not need the variance of interference $\omega_k^2$. For the data subcarriers that are corrupted, the bit LLR is determined using ReLLR 701

$$LLR(b_i) = \log \frac{\sum\limits_{s_k:b_i=0} \frac{1}{|\tilde{Y}_k - s_k|^2}}{\sum\limits_{s_k:b_i=1} \frac{1}{|\tilde{Y}_k - s_k|^2}},$$

$k \in N_{DI}$ where $N_{DI}$ denotes the set of corrupted data indexes.

The indexes of data subcarriers that are detected as uncorrupted 710 can be recovered from those that are detected as corrupted 416. Then, for the data subcarriers that are detected as uncorrupted, the bit LLR is determined using exact LLR (ExcLLR) 702

$$LLR(b_i) = \log \left( \frac{\sum\limits_{s_k:b_i=0} \exp\left(-|\hat{H}_k|^2 \frac{|\tilde{Y}_k - s_k|^2}{\sigma^2}\right)}{\sum\limits_{s_k:b_i=1} \exp\left(-|\hat{H}_k|^2 \frac{|\tilde{Y}_k - s_k|^2}{\sigma^2}\right)} \right), k \in N_{DC},$$

where $N_{DC}$ denotes the set of data indexes that are detected as uncorrupted, Decision Feedback and Channel Update Decision feedback can be used to enhance the performance of decoding without requiring extra information. A decision feedback method according to one embodiment of the invention is used to improve channel estimation for OFDM networks with PBPTI.

Figure 8:
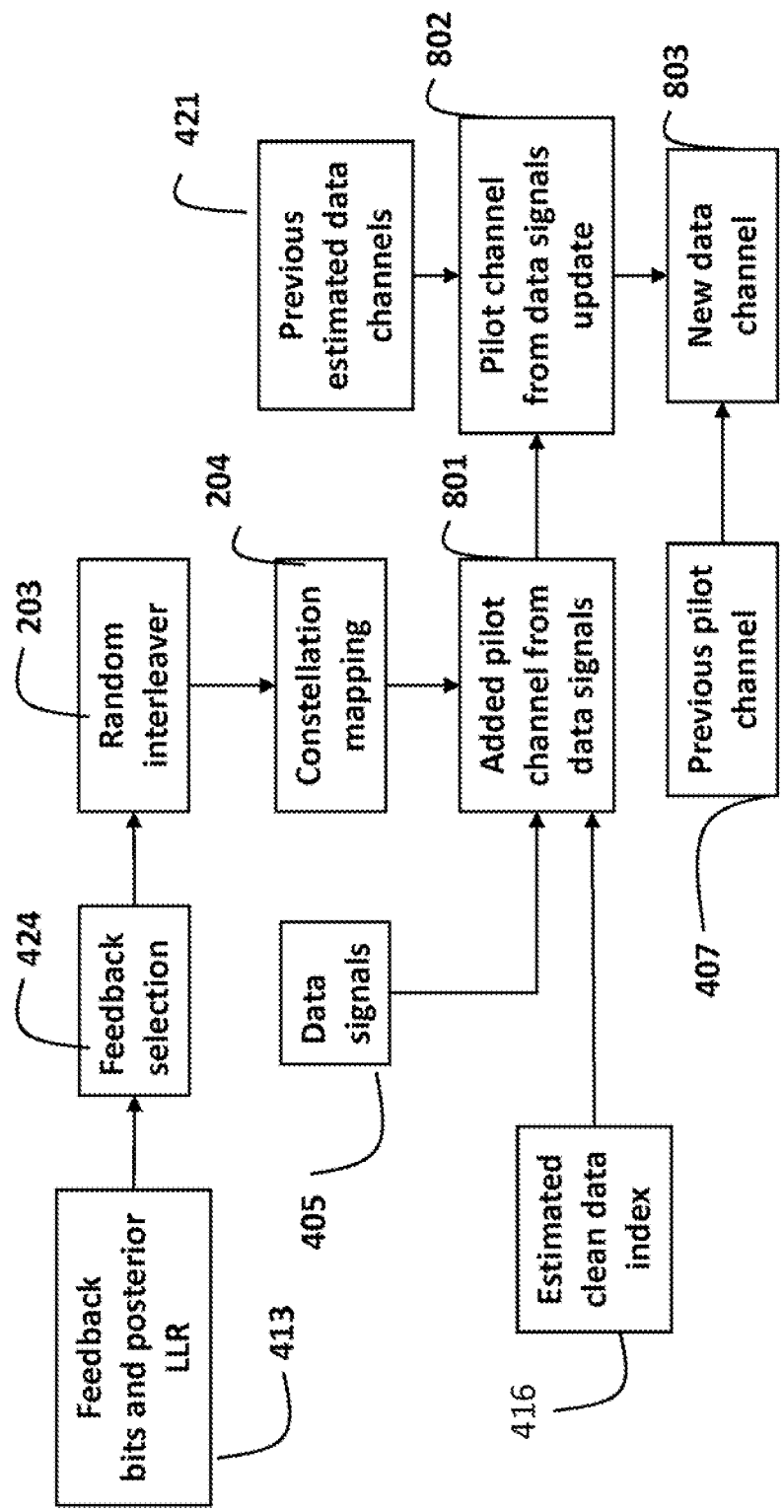
FIG. 8 is a block diagram of decision feedback process to improve channel estimation according to embodiments of the invention.

FIG. 8 shows the feedback method. The output of LDPC decoder 413 includes the decoded bits and their posterior LLRs. The posterior LLR indicates the confidence to the corresponding decoded bits.

A selector 424 filters out the low reliable decoded bits. The output bits are re-interleaved 203 and modulated 204 using the same interleaver and constellation as used in the transmitter. The resulting symbols can be used to obtain new pilot subcarriers from data subcarriers as 801

$$\hat{Y}_k = \frac{Y_k s_k^*}{|s_k|^2} = H_k + \frac{n_k s_k^*}{|s_k|^2},$$

$k \in N_{DC} \cup N_{FB}.$ where $N_{DC}$ denotes the index set that is detected as uncorrupted and $N_{FB}$ denotes the index set that has high posterior LLR.

The previous estimated channels, obtained through interpolation of previous pilot signals, on corresponding data signals are combined with these new pilot signals $\hat{Y}_k$ to update estimation on newly added pilot channels 802. The estimation of new pilot channels is used to interpolate data channels 803.

Figure 9:
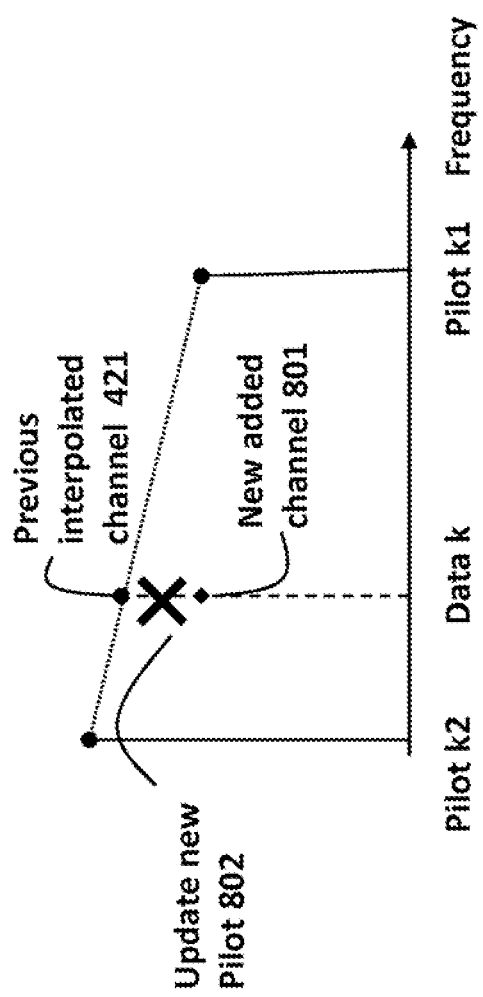
FIG. 9 is a schematic to obtain new pilot channels from the feedback data and previous interpolated channels.

FIG. 9 schematically shows updating newly-added pilot channels 802. The previous estimated channel 421 is obtained through linear interpolation of neighboring pilot signals. It is possible that the corresponding pilot released from feedback 801 has different value compared to the previous one. Note that these two estimates of the same channel have independent additive noise.

Combing both values can decrease the estimation error. Some methods of combination that can be used here are arithmetic mean of these two channels or linear combination to minimize mean square error (MMSE) of the resulting estimation error.

Effect of the Invention

PBPTI with unknown parameters severely degrades the performance of OFDM networks. Conventional interference reduction techniques first need to estimate statistical parameters of channels and interference, and require high computation complexity.

In contrast, the invention models interference as a time-frequency hopping Gaussian noise that corrupts consecutive frequency subcarriers and hops independently over OFDM symbols.

Our OFDM network uses low-density parity-check (LDPC) codes to resolve interference without estimating its spectrum beforehand. In contrast to conventional log-likelihood ratio (LLR) determination that requires the variance information of noise-plus-interference, a resilient LLR, independent of signal-to-interference-plus-noise ratio, is used to obtain prior LLRs for soft iterative decoding.

The bit-error-rate (BER) is improved approximately by 2~3 dB compared with prior art methods where channel information and interference parameters are perfectly known. Decision feedback methods are also described to enhance channel estimation, and 0.5~1 dB improvement can be obtained compared to an open-loop method.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for reducing interference in a received orthogonal frequency division multiplexing (OFDM) symbol modulated according to selected constellation points $s_k$, wherein the received symbol includes a set of pilot signals and a set of data signals $y_k$, and k is a number of consecutive subcarriers used for the pilot and the data signals, comprising steps of:

thresholding the set of pilot signals to detect interfering pilot signals;

erasing the detected interfering pilot signals;

estimating channels $\hat{H}_k$ using remaining pilot signals; $\hat{H}_k$ determining, for each bit $b_i$, in the set of data signals, a logarithmic likely ratio (LLR)

$$\log \frac{\sum_{s_k:b_i=0} \frac{1}{|y_k - \hat{H}_k s_k|^2}}{\sum_{s_k:b_i=1} \frac{1}{|y_k - \hat{H}_k s_k|^2}};$$

and decoding the set of data signals based on the determined LLR, wherein the steps are performed in a receiver, wherein k and i are integers.

2. The method of claim 1, wherein the interference in the received OFDM symbol is partial-band and partial-time interference.

3. The method of claim 1, where the set of pilot signals is a combination of fixed and random pilot signals.

4. The method of claim 1, wherein the thresholding step further comprises:

comparing a relative power of each pilot signal of the set of pilot signals to a variance of additive white Gaussian noise.

5. The method of claim 1, further comprising:

feeding back each bits $b_i$ in the set of data signals to improve the estimating.

6. A method for reducing interference in an approximate received orthogonal frequency division multiplexing (OFDM) symbol modulated according to selected constellation points $s_k$, wherein the received symbol includes a set of pilot signals and a set of approximate $y_k$ data signals, and k is a number of consecutive subcarriers used for the pilot and data signals, comprising steps of:

thresholding the set of pilot signals to detect interfering pilot signals;

erasing the detected interfering pilot signals;

estimating channels $\hat{H}_k$ using remaining pilot signals; $\hat{H}_k$ determining, for each bit $b_i$, in the set of data signals, a logarithmic likely ratio (LLR)

$$LLR(b_i) = \log \left( \frac{\sum_{s_k:b_i=0} \exp\left(-|\hat{H}_k|^2 \frac{|\tilde{Y}_k - s_k|^2}{\sigma^2}\right)}{\sum_{s_k:b_i=1} \exp\left(-|\hat{H}_k|^2 \frac{|\tilde{Y}_k - s_k|^2}{\sigma^2}\right)} \right);$$

and decoding the set of data signals based on the determined LLR, wherein the steps are performed in a receiver, wherein k and i are integers, $\sigma^2$ is a variance of additive noise and $\tilde{Y}_k$ is an equalization of the received symbol.

* * * * *